United States Patent [19]

Beard

[11] 4,362,625

[45] Dec. 7, 1982

[54] WASTE WATER CLARIFIER

[76] Inventor: Harold Beard, P.O. Box 3838, Baton Rouge, La. 70821

[21] Appl. No.: 316,112

[22] Filed: Oct. 29, 1981

[51] Int. Cl.³ .......................................... B01D 21/00
[52] U.S. Cl. .................................. 210/521; 210/170; 210/532.1
[58] Field of Search .................. 210/170, 242.1, 242.3, 210/521, 532.1, 923

[56] References Cited

U.S. PATENT DOCUMENTS

| Re. 22,652 | 6/1945 | Reybold et al. | 210/151 |
|---|---|---|---|
| 1,774,793 | 9/1930 | Egan | 210/237 |
| 2,233,218 | 2/1941 | Moore | 210/170 X |
| 2,374,772 | 5/1945 | Nordell | 210/255 |
| 3,517,812 | 6/1970 | Bucchioni et al. | 210/73 |
| 3,701,429 | 10/1972 | Schell | 210/242 |
| 3,744,257 | 7/1973 | Spanner | 210/242 |
| 3,817,383 | 6/1974 | Michel et al. | 210/170 |
| 4,038,185 | 7/1977 | Kline | 210/519 |
| 4,087,361 | 5/1978 | Block et al. | 210/199 |
| 4,116,835 | 9/1978 | Bertelson | 210/255 |
| 4,119,541 | 10/1978 | Makaya | 210/242 R |
| 4,219,424 | 9/1980 | Tamura et al. | 210/201 |
| 4,257,889 | 3/1981 | Wober et al. | 210/923 X |
| 4,265,757 | 5/1981 | Ivanoff | 210/923 X |
| 4,303,516 | 12/1981 | Stensel et al. | 210/195.4 |

FOREIGN PATENT DOCUMENTS

| 514517 | 6/1954 | Belgium | 210/170 |
|---|---|---|---|
| 996122 | 12/1951 | France | 210/170 |
| 373800 | 8/1939 | Italy | 210/170 |

*Primary Examiner*—Robert H. Spitzer
*Attorney, Agent, or Firm*—Roy, Kiesel, Patterson & McKay

[57] ABSTRACT

A process and apparatus for treatment of waste water is provided wherein a waste water clarifier is positioned in a waste water flow channel and having a body assembly provided with a bow section facing into and extending above the waste water current, a stern section having an opening below the waste water level to allow the waste water to enter the clarifier, a bottom section constructed from rows of baffle plates wherein the rows are separated from one another by openings to allow the solids settled in the clarifier to re-enter the waste water flow channel, and an effluent launder fixedly positioned in the bow section.

7 Claims, 4 Drawing Figures

WASTE WATER CLARIFIER

BACKGROUND OF THE INVENTION

1. Field of the Invention

This invention relates in general to waste water treatment and more specifically to a clarifier placed in a waste water flow channel.

2. Prior Art

In conventional waste water treatment processes a portion or all of the waste water is diverted to a settling pond or a flow channel. There the solids contained in the waste water are separated out by settling or chemical treatment. The purified water is then returned to the main waste water stream for final disposition.

The difficulty with the prior art processes is that they result in the addition of contaminating chemical or require extremely large settling ponds or clarifiers relative to the amount of waste water treated or treatment time is too long.

SUMMARY OF THE INVENTION

Therefore, it is an object of this invention to provide a waste water clarifier which can more rapidly remove solids from a waste water stream.

Another object of this invention is to provide a waste water clarifier which results in a reduced sized settling stream for a given quantity of waste water to be treated.

Still another object of this invention is to provide a waste water clarifier that does not require the addition of chemicals to remove solids from waste water.

A further object of this invention is to provide a waste clarifier which requires no scraping mechanisms.

These and other objects and advantages of this invention will become apparent from the ensuing descriptions of the invention.

Accordingly, a clarifier for removing suspended solids from waste water in a waste water flow channel is provided comprising a boat shaped structure with its bow directed into the waste water flow and having its stern section below the channel waste water level to allow the waste water to enter the clarifier, a bottom or keel section constructed from rows of hollow baffle plates separated by openings to allow settled solids to re-enter the channel, and an effluent launder having a trough positioned in the bow section and having means to allow the clarified waste water to enter the trough.

PREFERRED EMBODIMENTS OF THE INVENTION

Figure 1:
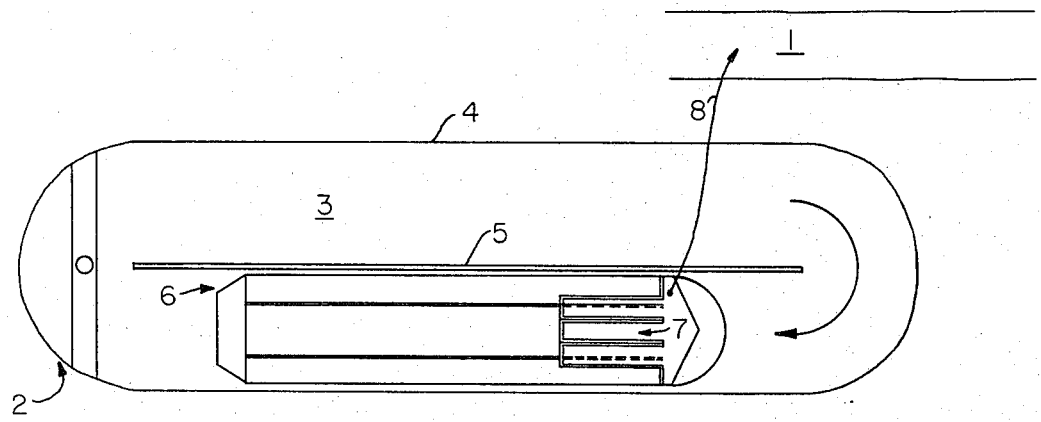
FIG. 1 is a top view of a waste water flow channel with a preferred embodiment of the clarifier positioned therein.

In a waste water treatment process according to this invention as seen in FIG. 1, at least a portion of the main waste water stream, is removed by conduit 2 which is provided with conventional screens for removal of large solid materials such as branches, etc. The waste water containing principally suspended solids is then dumped into a waste water channel 3 formed by concrete walls 4 and 5. Within channel 3 the waste water is directed to flow in the directions indicated by the arrows. As the water flows past the clarifier, denoted generally by the numeral 6, a portion flows into clarifier 6, where the waste water is separated into a solid stream and a clarified water stream. The clarified water stream is directed into effluent launder 7 where it is pumped through conduit 8 to stream 1.

Figure 2:
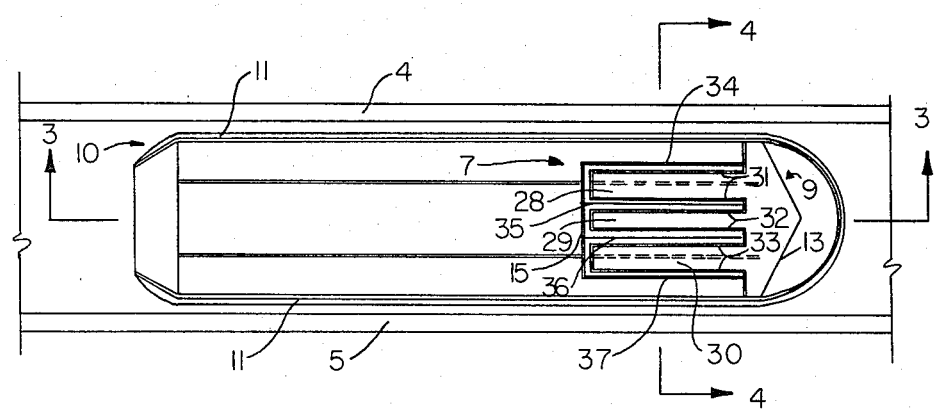
FIG. 2 is a top view of a preferred clarifier structure of this invention.
Figure 3:
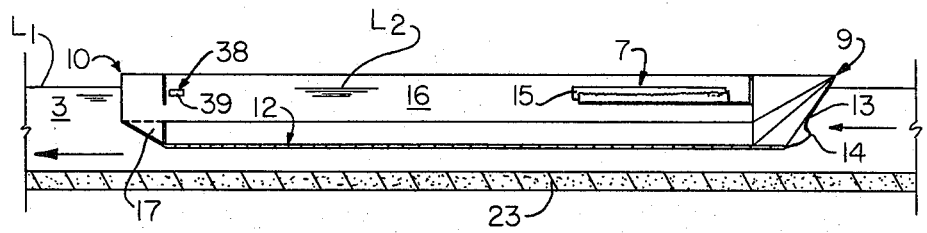
FIG. 3 is a longitudinal cross-sectional view taken along lines 3—3 of FIG. 2.
Figure 4:
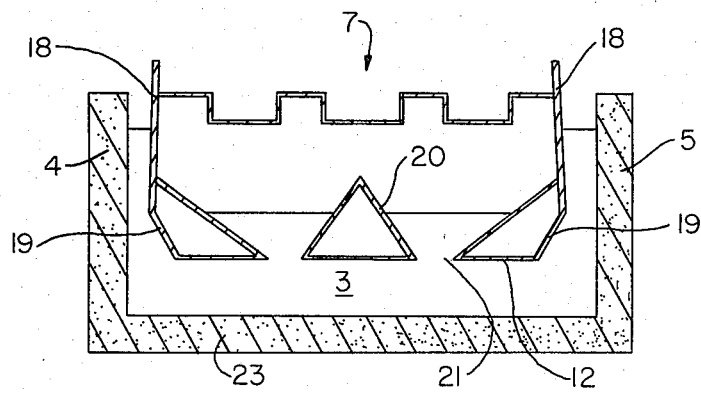
FIG. 4 is a vertical cross-sectional view taken along lines 4—4 of FIG. 2.

Referring now to FIGS. 2–4, a particularly preferred embodiment of clarifier 8 is illustrated comprising, in general, a bow or forward section 9, a stern or rear section 10, side walls 11 and keel or bottom panel 12 attached to one another in a boat-like shape as shown.

Forward section 9 is constructed from an arcuately-shaped bow wall 13 sloped inward from the top, and preferably to bulb-shaped protrusion 14 used to stablize clarifier 1.

Rear section 10 comprises an inwardly sloped panel 17 that is positioned below the channel waste water level "$L_1$" to allow the waste water from channel 3 to flow into clarifier rear chamber 24 where it will eventually rise to level "$L_2$" in middle chamber 16 as shown.

The forward section 9 and rear section 10 are attached by side walls 11 which in a preferred embodiment are each constructed from a top flat panel 18 and bottom flat panel 19 angled outward along their line of attachment. In this manner less turbulence is created in the waste water as it flows past clarifier 1.

The keel or bottom panel 12 is constructed from parallel rows of hollow tubes 20, preferably rhombus-shaped, which depending on their orientation are fixed in position by attaching to side walls 11 as in the alternative the forward and rear sections 9 and 10. Tubes 20 are separated from one another to create slot openings 21 through which solids being settled out of the waste water can re-enter channel 3. Positioned in top of clarifier 6 at forward section 9 is effluent launder 7 which is constructed with multiple troughs 28, 29, and 30 whose sides 31, 32 and 33, respectively, and back side 15 extend upward. To a level slightly below level "$L_2$" to allow the clarified water from clarifier chamber 16 to enter the troughs. In another preferred embodiment side baffles 34, 35, 36, and 37 are positioned along side trough 31, 32 and 33 as shown with a front baffle positioned in front of troughs 28, 29 and 30 and all of which extend above "$L_2$."

In another preferred embodiment screen parts 38 having adjustable openings 39 are positioned so that any floating solids can be removed from clarifier chamber 24 by conventional means.

In operation clarifier 1 is placed in channel 3 so that forward section 9 faces into the waste water current. Because clarifier 1 restricts the waste water flow, the velocity of the waste water is increased as it passes clarifier 1. In this regard it is preferred that clarifier 1 be positioned near channel bottom 23 to increase the waste water velocity past clarifier 1. It is also preferred that clarifier 1 be anchored in position by any conventional means. This increased velocity results in waste water entering clarifier chamber 16 to exit through slot openings 21. The waste water entering rear panel section 10 flows toward forward section 9. Since this flow is at a substantially reduced velocity solids suspended in the waste water settle toward tubes 20 and are removed through slot openings 21. This results in a clarified waste water strata at the upper portion of clarifier chamber 16. This clarified strata is allowed to enter troughs 28, 29 and 30 where it is removed by conduit 8 and discharged to the main stream 1. It has been found that by using the clarifier configuration claimed turbulance of the waste water flowing past clarifier 1 and turbulance of the waste water in clarifier chamber 16 has been minimized resulting in more rapid and efficient removal of solids from the waste water.

There are, of course, many alternate embodiments not specifically shown but which are intended to be included within the scope of this invention as defined by the following claims.

What I claim is:

1. A clarifier for removing solids from waste water in a waste water flow channel comprising,
   (a) a forward section connected to a rear section by side walls, said forward section and side walls rising above said waste water, said rear section having an opening below the waste water level to allow said waste water to enter a cavity formed by the forward section, the rear section and the side walls,
   (b) a bottom panel attached to said side walls below said waste water level, said bottom panel having rows of vertically inclined baffle plates separated by openings to allow said solids to flow from said cavity back to said channel; and,
   (c) an effluent launder attached to said side walls and positioned in said forward section, said launder comprising a trough having means to allow said waste water located in said cavity to enter said trough.

2. A clarifier according to claim 1 wherein said forward section has a arcuately-shaped vertical wall.

3. A clarifier according to claim 2 wherein said vertical wall is sloped inward from top toward the bottom of said vertical wall.

4. A clarifier according to claim 3 wherein said vertical side is provided with a bulb-shaped protrusion positioned at the bottom section of said vertical side.

5. A clarifier according to claim 1 wherein said rows are positioned parallel with said side panels.

6. A clarifier according to claim 1 wherein said baffle plates have hollow cavities.

7. A clarifier according to claim 1 wherein each of said side panels comprises a top flat section and bottom flat section angled outward toward a line at which they are sealingly attached.

* * * * *